3,584,046
N,N'-BIS(AMINOBENZOYL)ISOPHTHALOYLDI-
HYDRAZIDE AND N,N'-BIS(AMINOBENZOYL)
TEREPHTHALOYLDIHYDRAZIDE
Jack Preston, Raleigh, N.C., assignor to Monsanto
Company, St. Louis, Mo.
No Drawing. Filed Apr. 17, 1967, Ser. No. 631,183
Int. Cl. C07c 103/44
U.S. Cl. 260—558                         1 Claim

ABSTRACT OF THE DISCLOSURE

New symmetrical aromatic diamine monomers containing hydrazide linkages are prepared and temperature resistant ordered linear condensation polymers formed in situ from these monomers.

BACKGROUND OF THE INVENTION

Synthetic linear condenation polymers such as polyamides in the form of fiber, filaments, films, and other shaped articles have found wide application in textile and other industrial end uses requiring high tensile strength, abrasion resistance and resistance to thermal and other degradative conditions. Subsequent searching for polymers having improved physical properties and resistance to degradation has produced various heterocycle polymers such as polyoxadiazoles, polybenzimidazoles, polyimides and copolymers of two or more heterocycles. Typical of such polymers are those described in U.S. Pats. 2,895,948; 2,904,537 and 3,044,994 and by Culberston et al. (J. Polymer Sci., B–4, 249 (1966)). Wholly aromatic polyamides such as those formed by the self-condensation of aromatic amino acids, or by the condensation of aromatic diamines with aromatic diacid chlorides have also been found to be resistant to high temperatures and to have excellent physical properties. Such polymers include those in British Pat. 901,159, Belgian Pat. 569,760 and U.S. Pats. 3,006,899 and 3,049,578.

Another class of polymers having improved physical properties and resistance to degradation are the wholly aromatic polyoxadiazoles prepared from polyhydrazides such as those described by Frazier et al. (J. Polymer Sci., A–2, 1157 (1964)), Iwakura et al. (J. Polymer Sci., A–3, 45 (1965)), and in U.S. Pats. 3,130,182–3.

It is also known that ordered wholly aromatic polyamides made by polymerizing diacid chlorides with ordered aromatic diamines containing preformed carbonamide linkages have exceptionally high thermal stability. Typical of such polymers are those described in my copending applications, Ser. Nos. 592,347 and 609,010. Furthermore, it has been found that in the —AA—BB— type of ordered polymers described above, the use of symmetrical AA and BB units results in improved mechanical and thermal properties.

SUMMARY OF THE INVENTION

This invention is concerned with a solution method for the preparation of symmetrical aromatic diamine monomers containing internal hydrazide linkages and high molecular weight linear ordered condensation polymers derived therefrom having a regular recurring sequence of functional groups in each repeating units of the polymer chain which fulfill the same conditions of order and symmetry described above. The monomers may be isolated from solution after formation or they may be used for the in situ preparation of condensation polymers without isolation.

Advantages of the ordered monomers and polymers obtainable by the process described in this invention are that they (1) may be prepared from relatively inexpensive commercially available monomers, (2) may be prepared by simple one or two step reactions that are easy to carry out, (3) allow one to vary the polymer structure in a controlled manner, (4) have greatly improved properties and stability relative to unordered polymers of the same general structure and (5) are precursors readily converted into ordered heterocycle amide and other copolymers having a symmetrical structure and improved properties.

Accordingly, it is an object of this invention to provide a method for the preparation of novel symmetrical aromatic diamines containing internal hydrazide groups.

Another object of this invention is to provide a method for the in situ preparation of novel hydrazide copolymers which are characterized by the fact that they contain two hydrazide groups and a group selected from amide, imide, urea and urethane, in each repeating unit which appear in a perfectly regular sequence along the polymer chain, each group being separated by an aromatic nucleus and further characterized by the fact that there is at least one point in each repeating unit of the polymer through which a plane of symmetry can be drawn.

Another object of this invention is to provide a method for the preparation of polymers having improved physical properties and thermal stability.

Still another object of the invention is the provision of linear wholly aromatic hydrazide copolymers capable of being converted to ordered 1,3,4-oxadiazole copolymers and said copolymers having at least one plane of symmetry in each recurring units.

Other objects and advantages will become apparent from the description of the invention which follows hereinafter.

DETAILED DESCRIPTION AND PREFERRED EMBODIMENTS

The preparation of the aromatic diamine monomers of this invention may be represented by the reaction of a compound AB (in which the B part is more reactive than the A part) with a compound CC to give a product having the structure ABCCBA. The polymers of this invention are prepared by the reaction of such an ABCCBA type monomer with a DD type monomer, resulting in polymers represented by the structure ABCCBADD. The DD monomer may be the same as, or different from the CC monomer.

The BACCBA monomers prepared by the first step of the process of this invention may be more completely represented by the general structure

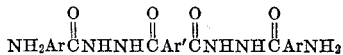

in which Ar and Ar' may be the same or different but must consist of one or more divalent aromatic or heterocyclic single, multiple, or fused ring systems characterized by benzenoid unsaturation.

The diamine monomer process of the invention involves the preparation of aromatic diamine monomers in solution having the general formula:

wherein Ar and Ar' may be the same or different but must consist of one or more aromatic or heterocyclic single, multiple, or fused ring systems characterized by benzenoid unsaturation. In the above formula Ar and Ar' can obtain optionally linkages other than carbon-carbon, such as

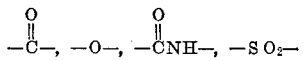

and the like internally. In each

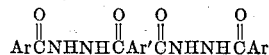

linkage, the central aromatic divalent radical Ar' may have a different orientation from the two outer Ar aromatic divalent radicals which must both have the same orientation and structure so that it should be possible to place the plane of symmetry through Ar' in such a way that a pair of mirror images are produced.

The divalent aromatic radicals may be, for example, one or more of the following:

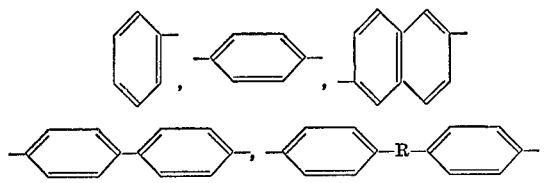

where R represents a linkage such as for example

and the like.

Heterocycle ring structures may be substituted for the aromatic radicals in the formulas above.

The aromatic diamine monomers of the invention may be prepared by the reaction of an aromatic diacid halide with the monohydrazide of an aromatic amino acid at a temperature below 100° C. The monohydrazides may be prepared by the reaction of hydrazine with an ester of an aromatic amino acid.

As examples of the diamines of this type which result from the practice of this invention, the following are representative:

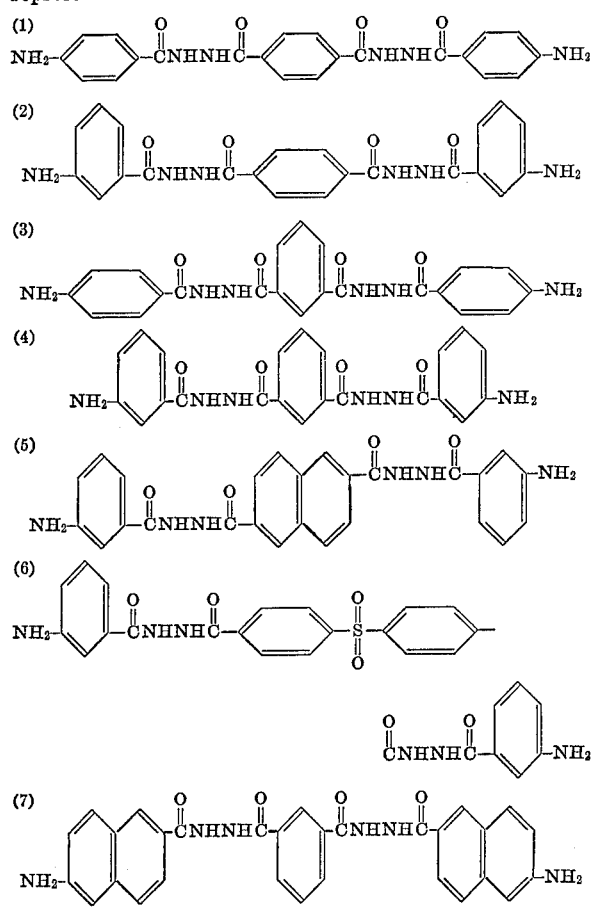

The process of this invention also describes a method for the preparation of ordered condensation polymers by reacting together two monomers (one of which is an aromatic diamine of the type just described) each monomer containing functional groups which react with the functional groups of the other to produce an ordered polymer containing two hydrazide groups separated by an aromatic ring in each repeating unit and which appear in a perfectly regular sequence along the polymer chain.

As examples of monomers, useful for reaction with the aromatic diamines above, in the preparation of polymers by the process of the invention, there may be mentioned aromatic carbonyl containing compounds having the following general structures:

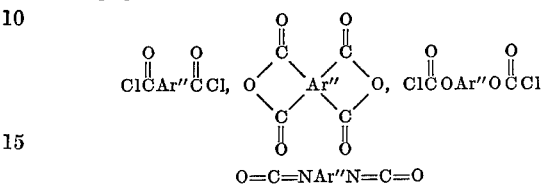

wherein Ar" is a multivalent aromatic hydrocarbon radical.

Suitable symmetrical dicarboxylic acids or diacid derivatives which may be used in the process described in this invention include those diacid compounds in which the carbonyl radicals are joined by aromatic or heterocyclic linkages; for example, aromatic diacid halides, or substituted derivatives thereof. These diacid monomers may be prepared by any of the well known prior art methods used to prepare aromatic diacid compounds.

Suitable symmetrical dianhydrides which may be useful in the preparation of these polymers, include those in which the two anhydride groups are joined by aromatic or heterocyclic moieties; for example, aromatic dianhydrides, such as pyromellitic dianhydride, or substituted derivatives thereof. These dianhydride monomers may be prepared by any of the well known prior art methods used to prepare dianhydrides.

Suitable symmetrical diisocyanates which may be useful in the preparation of these polymers, include those diisocyanate compounds in which the isocyanate groups are joined by aromatic or heterocyclic moieties. Examples of such aromatic diisocyanates are p,p'-diphenylmethane diisocyanate, m-phenylene diisocyanate, p-phenylenediisocyanate, 1,5-naphthalene diisocyanate and other symmetrical aromatic diisocyanates.

The use of the term "symmetrical" herein is intended to relate to a characteristic of the polymers of this invention which may be described by the fact that there is at least one point in each repeating unit of the polymers through which a plane of symmetry can be drawn. For example, a typical repeating unit may be shown as follows:

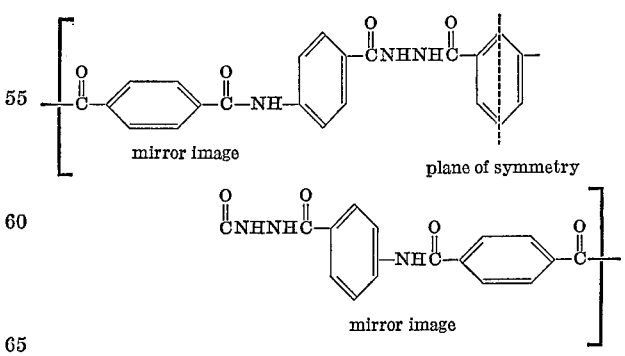

The preparation of linear ordered condensation polymers from the above diamines is by reaction with diacid chlorides, dianhydrides, diisocyanates and the like, to give polymers having the following general structure:

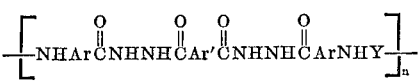

wherein Ar and Ar' have the significance previously attributed to them and Y is a divalent nucleus selected from one of the following

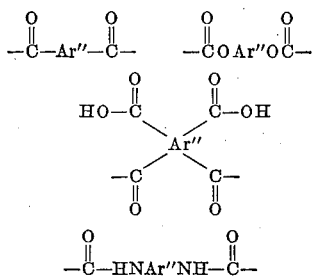

wherein Ar'' has the significance previously attributed.

As examples of polymers obtainable by the process of this invention and embraced by the general formula previously shown are the following:

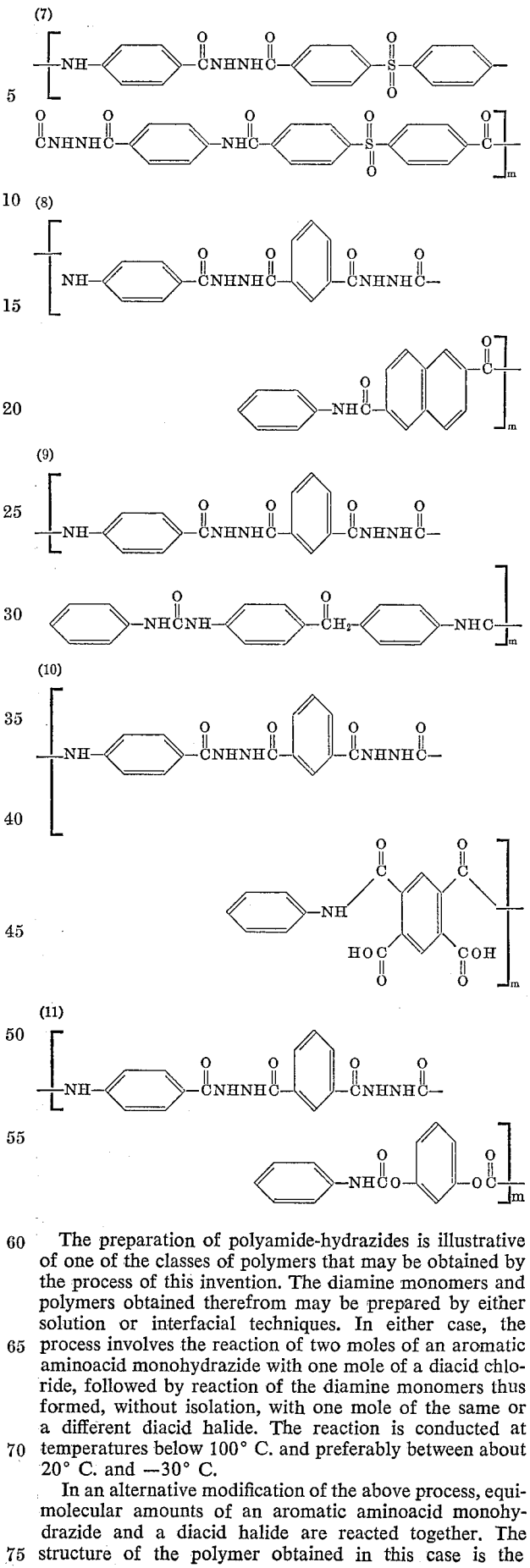

The preparation of polyamide-hydrazides is illustrative of one of the classes of polymers that may be obtained by the process of this invention. The diamine monomers and polymers obtained therefrom may be prepared by either solution or interfacial techniques. In either case, the process involves the reaction of two moles of an aromatic aminoacid monohydrazide with one mole of a diacid chloride, followed by reaction of the diamine monomers thus formed, without isolation, with one mole of the same or a different diacid halide. The reaction is conducted at temperatures below 100° C. and preferably between about 20° C. and −30° C.

In an alternative modification of the above process, equimolecular amounts of an aromatic aminoacid monohydrazide and a diacid halide are reacted together. The structure of the polymer obtained in this case is the same as that obtained on reacting two moles of the monohydrazide with one mole of diacid halide, followed by reacting the diamine thus formed with another mole of the same diacid chloride. This very surprising finding is due in all probability to the very rapid reaction of an acid halide with a hydrazide group relative to that of an aromatic amine group.

The process described in this invention may be carried out using well known solution or interfacial reaction techniques, for the preparation of monomers and polymers of this invention.

The solution method generally involves dissolving the diamine monomer or the monohydrazide in a suitable solvent which is inert to the monomer preparation or polymerization reaction. Among such solvents there may be mentioned dimethylacetamide, N-methyl - 2 - pyrolidone, 1,5-dimethyl - 2 - pyrolidone, hexamethylphosphoramide (HPT) and the like or mixtures of the above. These solvents are rendered more effective in many instances by mixing them with a small amount, up to 10 percent, of an alkali or alkaline earth metal salt such as lithium chloride, lithium bromide, magnesium bromide, calcium chloride and the like. The preferred solvent for the monomer reaction and the polymerization reaction is dimethylacetamide of dimethylacetamide containing a small amount of dissolved lithium chloride.

In the preferred method of preparation of an aromatic diamine monomer, a solution of the monohydrazide of the aromatic aminoacid is cooled to between 20 and −30° C. and the diacid halide is added either as a solid or in a solution of one of the aforementioned solvents. The mixture is stirred for a period of time until the reaction is complete. The monomer may be isolated by pouring the mixture into a non-solvent; or the solution of monomer may be used directly for the in situ preparation of polymers.

In the preparation of polymers, the diamine monomer solution is cooled to between 20 and −30° C. and the diacid halide, dianhydride, bis-chloroformate, or diisocyanate is added either as a solid or in a solution of one of the aforementioned solvents. The mixture is stirred until polymerization is substantially complete and a high viscosity is attained. The viscous polymer solution may be spun per se or the polymer solution may be isolated by pouring the mixture into a non-solvent, washing and drying the polymer and then preparing the spinning solution.

In some cases, the addition of a sufficient amount of proton acceptor to neutralize the acid by-products may be added, the exact amount being easily determined experimentally.

A proton acceptor, as the term is employed herein indicates a compound which acts as an acid scavenger to neutralize HCl, formed during the reaction, and which aids to carry the reaction to completion. Suitable proton acceptors include sodium carbonate, calcium carbonate, magnesium carbonate, and similar compounds which react as desired.

The interfacial technique may be used for the preparation of the diamine monomers of this invention, or it may be used for the preparation of polymers in the case of the polymerization of the above diamine monomers with diacid halides.

The interfacial reaction is conducted by mixing water, an emulsifier and the diamine monomer or the monohydrazide, which may be in the form of their hydrochlorides. A proton acceptor is then added and the mixture stirred rapidly. During this rapid stirring, a solution of the dicarbonyl compound in an inert solvent is added, the mixture stirred until the reaction is complete, and in the case of a polymerization reaction, the polymer is then isolated by filtration, washed, and dried. In the preparation of a diamine monomer from the monohydrazide, the product may be isolated in the same manner as the polymer, or the monomer mixture may be converted to polymer without isolation by the addition of another equivalent of the same or a different diacid halide. The solvent for the dicarbonyl monomer may be any convenient solvent such as a cyclic-non-aromatic oxygenated solvent such as for example a cyclic tetramethylene sulfone, 2,4-dimethyl cyclic tetramethylene sulfone, tetrahydrofuran, and cyclohexanone. Other suitable dicarbonyl monomer solvents include chlorinated hydrocarbons such as methylene chloride, chloroform and chlorobenzene, benzene, nitrobenzene, acetonitrile and the like.

The amounts of the various reactants which may be employed will, of course, vary according to the type of polymer desired. In most instances, however, substantially equimolecular quantities or a slight excess of diamine or monohydrazide to dicarbonyl compound may be used. For interfacial reactions, sufficient proton acceptor, such as those mentioned above, to keep the acidic by-products neutralized may be added, the exact amount being easily determined experimentally.

Suitable emulsifying agents for interfacial reaction or polymerization, include anionic and non-ionic compounds such as sodium lauryl sulfate, nonyl phenoxy (ethyleneoxy) ethane, the sodium or potassium salt of any suitable condensed sulfonic acid and the like.

Of the two methods used, the solution technique is generally preferred, because the polymer solutions thus formed can be spun directly. One advantage of isolating the polymer, however, lies in the face that these polymers may be redissolved in dimethyl sulfoxide without the addition of salts. The salts used in dissolving those polymers are known to have a deleterious effect on the stability of fibers containing them. Also, the solutions may be used for producing laminating resins when no salt is used in the solvent; likewise, valuable varnishes for coating metals, especially wire, can be produced when no salt is present in the solvent.

The products of this invention are useful in a wide range of textile and other industrial applications. In the form of fibers, filaments, and films, the polymers of this invention are thermally resistant as well as being resistant to other types of degradation. In addition, those polymers exhibit outstanding tensile properties, such as high tenacity and modulus.

This invention is further illustrated by the following examples in which all parts and percents are by weight unless otherwise indicated.

EXAMPLE I

Preparation of p-aminobenzhydrazide.

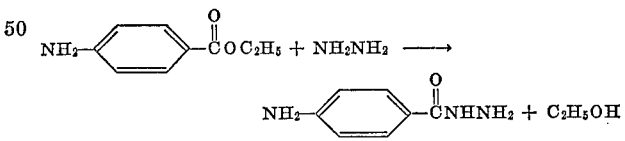

A mixture of 5 g. ethyl p-aminobenzoate, 17 g. hydrazine (96±%), 15 ml. ethanol, and 35 ml. water and refluxed for 4 hours. Upon cooling, 4 g. of crude p-aminohydrazide (M.P. 223–225° C.) separated. After recrystallization, the product has a M.P. of 230–232° C.

EXAMPLE II

Preparation of Diamine D, by the reaction of p-aminobenzhydrazide (from Example I) and isophthaloyl chloride.

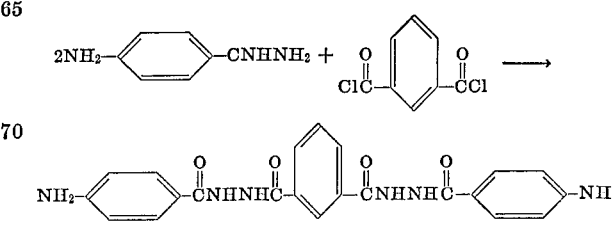

Diamine D

A mixture of 1.51 g. (0.01 mole) of p-aminobenzhydrazide, 100 ml. of water and 2 ml. of I N HCl were stirred rapidly. To the solution was added 3.5 g. sodium carbonate and 1.01 g. (0.005 mole) isophthaloyl chloride in 1 ml. tetrahydrofuran. A crude product, 1.5 g., of M.P. 280–300° C. was obtained; which melted at 305–306° C. after recrystallization from dimethylacetamide (DMAc).

EXAMPLE III

Preparation of Diamine D from p-nitrobenzhydrazide.

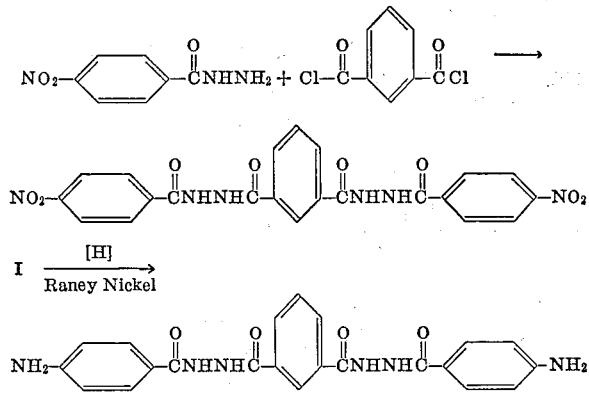

Diamine D

To a solution of 18.1 g. (0.1 mole) p-nitrobenhydrazide in 200 ml. dimethylacetamide (DAMc) at 0° C. was added 10.15 g. (0.05 mole) of isophthaloyl chloride. The reaction mixture was allowed to warm to room temperature (R. T.) and then stirred for two hours at R. T. The product was precipitated into water, whereupon a 21 g. yield of material, having a M.P. of 317–320° C., was obtained. Recrystallization of the crude dinitro compound from 110 ml. of dimethylformamide (DMF) afforded 20 g. of pure product; M.P. 319–320° C.

The dinitro intermediate was reduced in 200 ml. of DMAc using 2 g. of Raney nickel catalyst and hydrogen under pressure (290 p.s.i.) The mixture was heated to 100° C. at which time the pressure reached 345 p.s.i., and then fell off as the reduction proceeded. After cooling the bomb, the filtrate was collected and the product precipitated into 2 liters of water. A 16 g. yield of pure diamine was obtained; M.P. 305–306° C.

EXAMPLE IV

Preparation of Diamine D in solution.

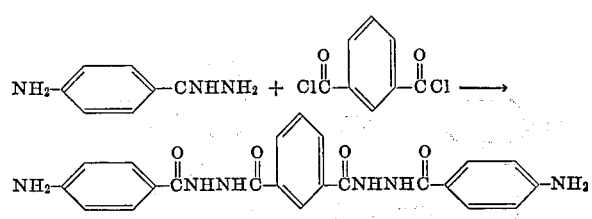

Diamine D

To a solution of 1.51 g. (0.01 mole) of p-aminobenzhydrazide in 10 ml. of DMAc, cooled to 0° C. was added 1.029 (0.005 mole) of isophthaloyl chloride. The solution was stirred at 0° C. for 15 minutes and then allowed to come slowly to room temperature. The crude diamine was isolated by pouring into water with vigorous stirring. After washing with water and drying, the crude product was purified by recrystallization from DMAc and a product obtained having a M.P. of 305–306° C.

Based on instrumental analysis, M.P. and other analytical data, there can be little doubt but the diamines of Examples II, III, and IV are the same. The greater reactivity of the $NH_2$—NH— group over the

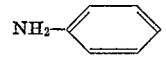

presumably is responsible for a preferential coupling taking place. In addition, polymers prepared from Examples II, III, and IV with the same diacid chloride were identical in every respect.

EXAMPLE V

Preparation of polyamide hydrazide from p-aminobenzhydrazide and terephthaloyl chloride by a one-step reaction in situ.

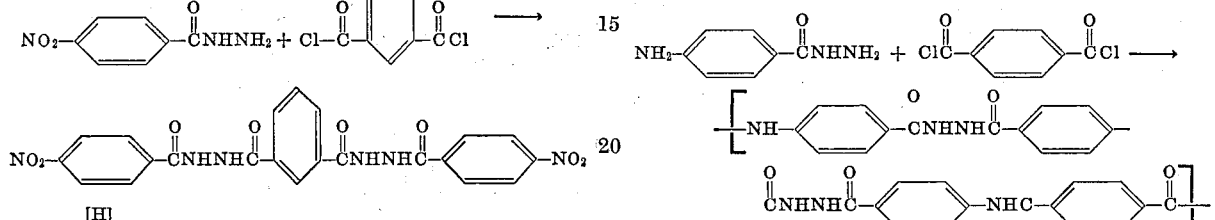

To a solution of 0.755 g. (0.005 mole) p-aminobenzhydrazide (Example I) in 12 ml. N-methyl pyrroldione (NMP) at 0° C. was added 1.02 g. (0.005 mole) terephthaloyl chloride. After stirring for several hours, films were cast from the viscous solution of polyamidehydrazide.

EXAMPLE VI

Conversion of the polymer of Example V to the corresponding 1,3,4-oxadiazole.

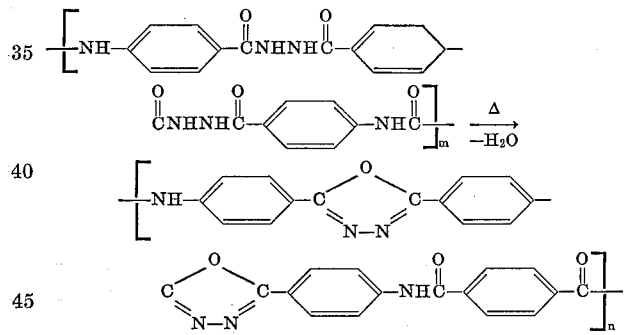

A film was cast of the polyamide-hydrazide. After removal of solvent, the film was heated at 140° C. for 16 hours, then at 290° C. for 15 min., 300° C. for 30 min., 330° C. for 15 min. and finally at 350° C. for 30 min. An infrared spectra of the film indicated that the hydrazide units had been converted to 1,3,4-oxadiazole units. After 3 days at 350° C. in air the film was still flexible.

EXAMPLE VII

Preparation of polyamide hydrazide from m-aminobenzhydrazide and terephthaloyl chloride by a one-step reaction in solution.

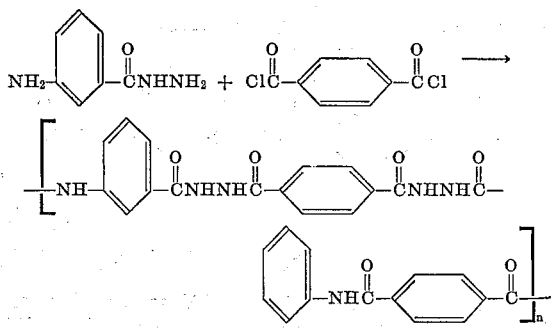

To a solution of 10.57 g. (0.07 mole) m-aminobenzhydrazide (prepared in the manner described in Example I), M.P. 96–97° C., in 95 ml. dimethylacetamide containing 5% dissolved lithium chloride was added, at −20° C., 14.21 g. (0.07 mole) terephthaloyl chloride. The solution was stirred at −20° C. for 5 min., and then allowed to warm to room temperature and stirred for 2 hours. The mixture was then neutralized with 3.36 g. lithium hydride slurried in 20 ml. DMAc. The clear viscous solution was spun to a 4.23 denier fiber of excellent luster.

Fiber properties were as follows:

T/E/Mi/work=5.41/18.6/85/0.676

The fiber had the following properties at elevated temperatures:

| | |
|---|---|
| 50° C. | 4.95/16.6/63 |
| 100° C. | 4.55/17.3/63 |
| 150° C. | 4.18/21.1/54 |
| 200° C. | 3.32/19.8/50 |
| 250° C. | 2.54/22.9/41 |
| 300° C. | 1.22/14.8/14 |

Upon heat-aging the above fiber in air at 300° C., the following results were obtained for a relaxed fiber:

| Hours | T/E/Mi work (denier) | |
|---|---|---|
| 4 | 1.96/14.1/58 0.233 (4.71) | |
| 8 | 1.76/10.8/58 0.145 (4.71) | |
| 24 | 1.67/7.41/61 0.098 (4.67) | |
| 24 | 1.78/8.66/63 0.124 (4.64) | (Under tension caused by contraction of fiber) |
| 48 | 1.61/7.59/57 0.095 (4.87) | |
| 120 | 1.65/7.07/61 0.090 (4.67) | |
| 168 | 1.49/5.75/57 0.063 (4.63) | |

EXAMPLE VIII

Preparation of polyamide-hydrazide from p-aminobenzhydrazide, isophthaloyl chloride and terephthaloyl chloride by a two-step reaction in solution.

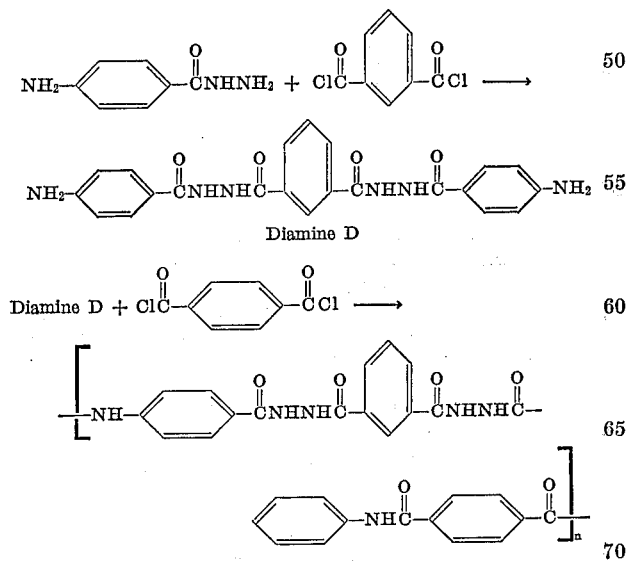

To a solution of 0.302 g. (0.002 mole) of p-aminobenzhydrazide in 5 ml. HPT at 0° C. was added 0.203 g. (0.001 mole) of isophthaloyl chloride. After stirring for two hours, 0.203 g. (0.001 mole) of terephthaloyl chloride was added. The polymer solution was then allowed to warm to room temperature. Excellent film was obtained from the viscous dope.

EXAMPLE IX

Preparation of polyamide hydrazide from p-aminobenzhydrazide, terephthaloyl chloride and isophthaloyl chloride by a two-step reaction.

To a solution of 0.302 g. (0.002 mole) of p-aminobenzhydrazide in 5 ml. of HPT at 0° C. was added 0.203 g. (0.001 mole) of terephthaloyl chloride. After 2 hours at 0° C., 0.203 g. (0.001 mole) of isophthaloyl chloride was added to the already viscous solution. The polymer dope was allowed to warm to room temperature, and cast into a film. Excellent film was obtained, which were tough, clear, and had good thermal stability at 300° C.

The polymer obtained was of a different structure, i.e. an isophthalamide-terephthaloyl hydrazide polymer instead of a terephthalamide-isophthaloyl hydrazide polymer. The properties are different from those of Example VIII.

EXAMPLE X

Preparation of polyamide hydrazide by the reaction of p-aminobenzhydrazide and isophthaloyl chloride by a one-step reaction.

To a solution of 0.755 g. (0.005 mole) p-aminobenzhydrazide (Example I) in 12 ml. NMP at 0° C. was added 1.02 g. (0.005 mole) isophthaloyl chloride. Excellent films were obtained from the viscous solution of polyamide hydrazide.

EXAMPLE XI

Preparation of polyamide hydrazide from Diamine D and isophthaloyl chloride.

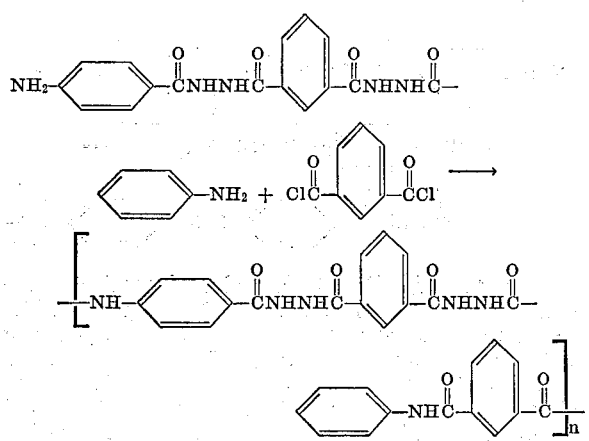

To a solution of 0.216 g. (0.005 mole) of Diamine D (prepared in solution and isolated) in 3 ml. NMP at 0° C. was added 0.102 g. (0.005 mole) isophthaloyl chloride. A viscous polymer solution was obtained after 2–3 hours from which films were cast. The structure was identical with that of Example X above, showing that the same product is attained by the two procedures.

EXAMPLE XII

Preparation of Diamine D and polyamic acid polymer therefrom by a two-step reaction in solution

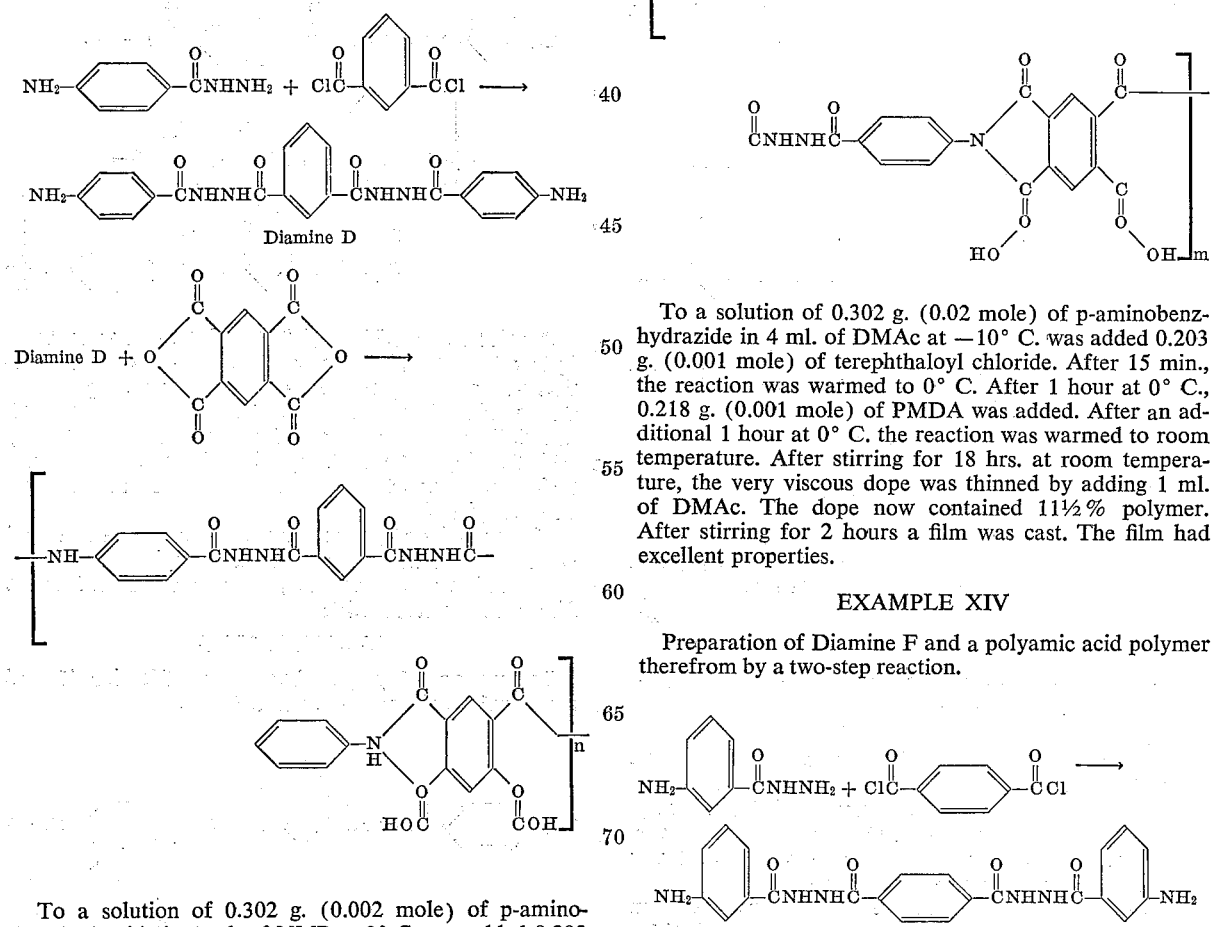

To a solution of 0.302 g. (0.002 mole) of p-aminobenzhydrazide in 4 ml. of NMP at 0° C. was added 0.203 g. (0.001 mole) of isophthaloyl chloride. After 1 hour, 0.218 g. (0.001 mole) of PMDA was added. The reaction was left at 0° C. for an additional hour. It was then stirred at room temperature for 20 hours. The clear dope gave a strong film of the polyamic acid polymer.

The film on heating to 300–350° C. in an oven was converted to the polyimide as indicated by IR spectra.

EXAMPLE XIII

Preparation of Diamine E and a polyamic acid polymer therefrom by a two-step reaction.

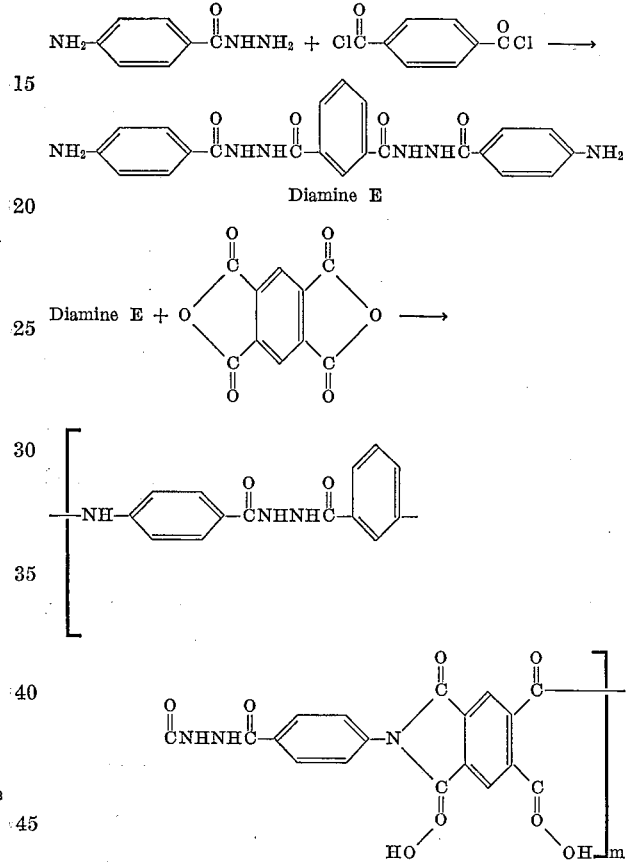

To a solution of 0.302 g. (0.02 mole) of p-aminobenzhydrazide in 4 ml. of DMAc at −10° C. was added 0.203 g. (0.001 mole) of terephthaloyl chloride. After 15 min., the reaction was warmed to 0° C. After 1 hour at 0° C., 0.218 g. (0.001 mole) of PMDA was added. After an additional 1 hour at 0° C. the reaction was warmed to room temperature. After stirring for 18 hrs. at room temperature, the very viscous dope was thinned by adding 1 ml. of DMAc. The dope now contained 11½% polymer. After stirring for 2 hours a film was cast. The film had excellent properties.

EXAMPLE XIV

Preparation of Diamine F and a polyamic acid polymer therefrom by a two-step reaction.

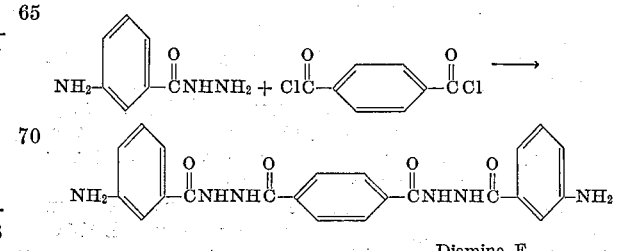

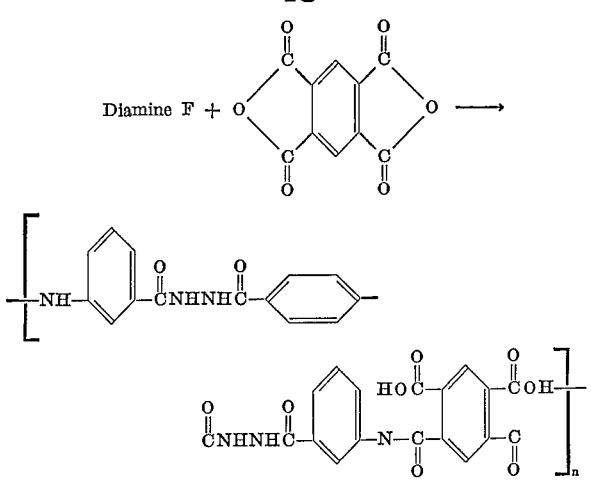

To a solution of 0.302 g. (0.002 mole) of m-aminobenzhydrazide in 4 ml. of DMAc was added, at −10° C., 0.203 g. (0.001 mole) of terephthaloyl chloride. After 15 minutes, the reaction solution was warmed to 0° C. After 1 hour at 0° C., 0.218 g. (0.001 mole) of PMDA was added. After an additional hour at 0° C., the polymerization mixture was warmed to room temperature. It was then stirred at room temperature for 20 hours. The 14% dope was moderately viscous, and gave a good film.

A portion of the dope was weighed out and diluted with DMAc to a concentration of 0.5%. The inherent viscosity at 30° C. was 1.02.

EXAMPLE XV

Preparation of Diamine D and a polyhydrazide urea therefrom in solution by a two-step reaction.

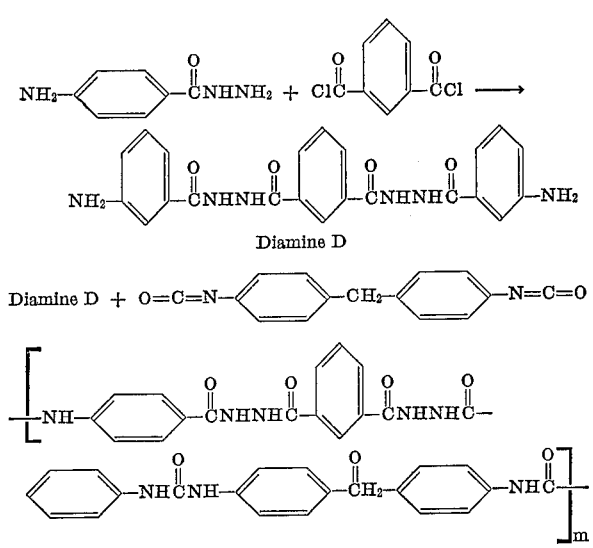

To a solution of 0.302 g. (0.002 mole) of p-aminobenzhydrazide in 4 ml. of DMAc, cooled to −15° C., was added 0.203 g. (0.001 mole) of isophthaloyl chloride. After 20 min., the reaction solution was warmed to 0° C. After 1 hr. at 0° C., 0.250 g. (0.001 mole) of MDI was added. After an additional 2 hours at 0° C., the polymerization mixture was warmed to room temperature. The clear dope was only of moderate viscosity. It was stirred at room temperature for 64 hours.

A viscosity was obtained for a 0.5% polymer solution prepared by diluting a portion of the dope with DMAc. The inherent viscosity at 30° C. was 0.708.

EXAMPLE XVI

Preparation of polyamide-hydrazide interfacially by a one-step reaction of p-aminobenzhydrazide and terephthaloyl chloride.

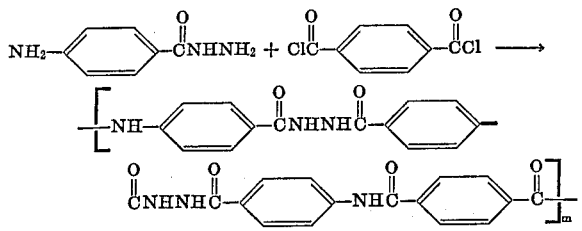

A solution of 1.51 g. (0.01 mole) of p-aminobenzhydrazide was dissolved in 150 ml. of boiling water. The solution was cooled to room temperature and placed in a Blender with 50 g. of ice, 0.1 g. of Dupanol ME, 2.2 g. sodium carbonate, and 10 ml. of tetrahydrofuran. The slurry was stirred rapidly and a solution of 2.03 g. (0.01 mole) of terephthaloyl chloride in 30 ml. of tetrahydrofuran was added. The reaction was stirred rapidly for 15 minutes.

The precipitated polymer was separated on a filter and washed with water several times before drying.

Solutions were prepared by dissolving in DMSO and films cast from this solution.

EXAMPLE XVII

Preparation of polyamidehydrazide interfacially by a one-step reaction of m-aminobenzhydrazide and terephthaloyl chloride.

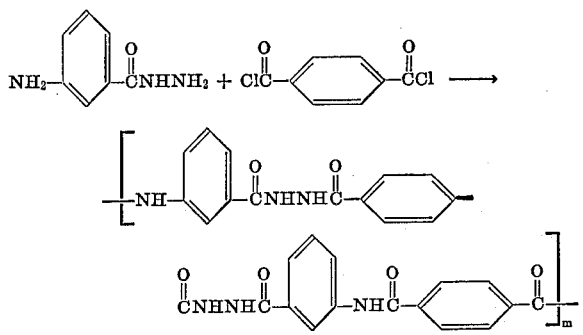

A solution of 0.76 g. (0.005 mole) of m-aminobenzhydrazide in 25 ml. of hot water was prepared. The solution was cooled, placed in a Blendor, and 25 g. of ice, 0.55 g. of sodium carbonate and 0.05 g. of Dupanol ME added. The slurry was stirred and a solution of 1.02 g. (0.005 mole) of terephthaloyl chloride in 10 ml. of tetrahydrofuran was added. The polymerization mixture was stirred rapidly for 30 minutes.

The precipitated polymer was separated on a filter and washed several times with water before drying.

A solution was prepared by dissolving in DMSO and a film cast from the solution.

EXAMPLE XVIII

Preparation of polyurethane from Diamine D and resorcinol bis-chloroformate in solution.

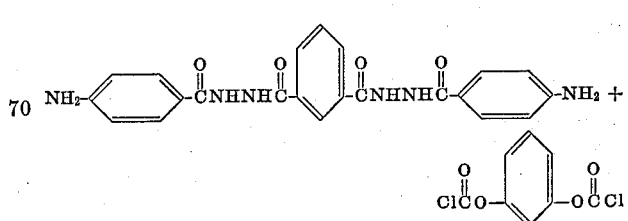

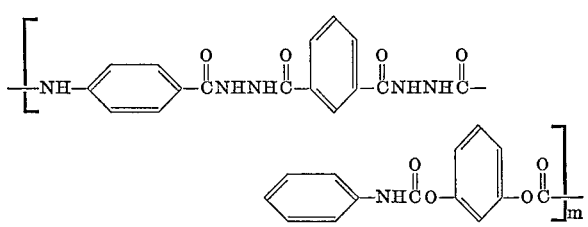

To a solution of 0.432 g. (0.01 mole) of Diamine D (prepared in solution and isolated) in 10 ml. of NMP at 0° C. was added a solution of 2.35 g. (0.01 mole) of resorcinol bischloroformate. After stirring for 2–3 hours during which time the temperature rose slowly to room temperature, the viscous solution was cast into films.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claim.

I claim:
1. A symmetrical diamine represented by the formula

NH$_2$—Ar—CONHNHCO—Ar'—CONHNHCO—Ar—NH$_2$ wherein Ar and Ar' are meta or para phenylene radicals.

References Cited
UNITED STATES PATENTS 3,184,468   9/1965   Siegrist et al. _____ 260—307
2,765,304   7/1965   Siegrist et al. _____ 260—240

HENRY R. JILES, Primary Examiner

H. I. MOATZ, Assistant Examiner

U.S. Cl. X.R.
260—559, 77.5, 78